United States Patent Office 3,455,979
Patented July 15, 1969

---

3,455,979
ALUMINUM CHELATE PREPARATION
Wolfram R. Kroll, Linden, N.J., assignor to Esso Research and Engineering Company, a corporation of Delaware
No Drawing. Filed June 5, 1967, Ser. No. 643,379
Int. Cl. C07f 5/06
U.S. Cl. 260—448
6 Claims

ABSTRACT OF THE DISCLOSURE

Dihaloaluminum actylacetonates are prepared by reacting aluminum trihalide with aluminum-tris-acetylacetonate or its derivatives with or without a solvent according to the following equation:

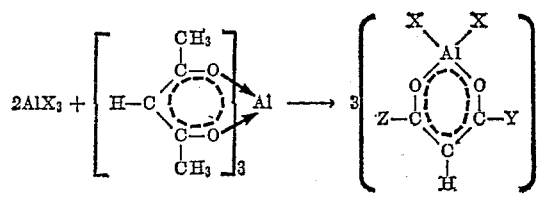

where X is halogen, Y and Z are alkyl, aryl, $CF_3$ or the like and where Y and Z may be the same or different.

---

Background

Dialkyl aluminum acetylacetonates are well known alumino-organic chelates which are suitable components of polymerization catalysts. For example, the in situ reaction product of aluminum trialkyls with acetylacetone is particularly suitable for the polymerization of acrylonitrile, as described in U.S. Patent No. 3,231,553 to Chiang, and for the polymerization of epoxides as described in U.S. Patent to Vandenberg, No. 3,135,706. The dialkyl aluminum acetylacetonate is usually prepared by reacting (chelating) an aluminum trialkyl with acetylacetone. The pure compound is not separated from the reaction mixture but the reaction mixture, as prepared, is used as the catalyst. In copending application, Ser. No. 584,964, filed Oct. 7, 1966, it is shown that dialkyl aluminum acetylacetonate can be produced and separated in pure form by distillation from the reaction mixture by reacting aluminum-tris-acetylacetonate with a trialkyl aluminum in a solvent at room temperature in accordance with the following equation:

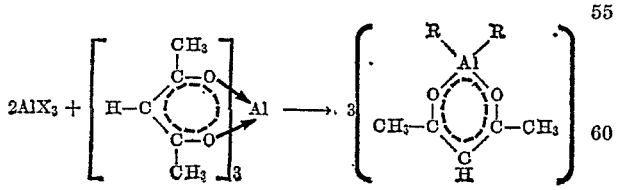

where R may be any alkyl group, e.g., from 1 to 10 carbon atoms.

Summary

It has now been found that the same reaction as described above can be used to prepare dihaloaluminum acetylacetonates. Thus, dichloroaluminum acetylacetonate is prepared in accordance with the following equation.

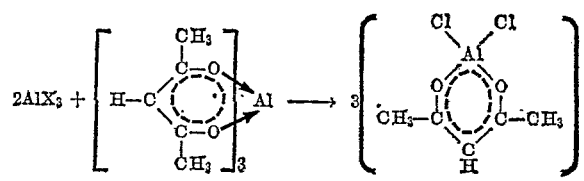

The dibromo, difluoro and mixed dihalo compounds can be formed similarly. The resulting dihaloaluminum acetylacetonates are very stable and are suitable as catalysts. They have advantages over aluminum chloride as they are more soluble and easier to purify. They have advantages over metallo-organic catalysts because of their lower price and easier handling. They are different from Friedel-Crafts catalysts in their unique tendency to form five coordinated complex compounds with Lewis bases and certain monomers. Instead of using acetylacetone as the chelate ligand substituted acetylacetones having the formula

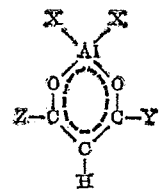

where Y and Z may be $CF_3$, alkyl, phenyl or the like and Y and Z may be the same or different, may be used.

Preferred embodiments

The reaction between the aluminum trihalide, e.g., aluminum chloride or bromide and the aluminum-tris-acetylacetonate may be carried out in the presence or absence of solvents; however the use of solvents is preferred. The reaction can be carried out by reacting the aluminum halide with the aluminum chelate or vice versa. In the case of limited solubility of the reactants in the solvent it is often necessary to promote the reaction by heating to as much as 200° C. and/or vigorous agitation, e.g. by the use of a ball mill or ultra-sonic devices. Suitable solvents are the $C_6$ to $C_{10}$ aromatic hydrocarbons, perhydro alicyclic hydrocarbons, $C_1$ to $C_{10}$ halogenated hydrocarbons, nitro-aliphatic hydrocarbons, and nitro-aromatic hydrocarbons, e.g. cyclohexane, benzene, toluene, xylenes, chlorinated naphthalene, nitromethane, halogenated aliphatics and aromatics, polyhalogenated aliphatics and aromatics, nitrobenzene and the like. Preferred solvents are aromatics and trihalomethanes. With reactive aluminum halides cooling to —60° C. may be necessary. The crude product can be purified by distillation, crystallization or sublimation.

Upon distillation under vacuum, for example, the dihaloaluminum acetylacetonate is obtained in high yield. It could not be expected that the dihaloaluminum acetylacetonate would be stable because of the possibility of its disproportionation into the starting components.

In order to illustrate the invention with greater particularity, the following specific examples are given, it being understood that they are intended to be only illustrative and not limitative.

Example 1

Commercial aluminum chloride (13.3 g.) and commercial aluminum-tris-acetylacetonate (16.2 g.) were reacted in 400 ml. $CHCl_3$ and ballmilled for several hours. The product was cleaned from unreacted matter by centrifugation and decantation. Subsequently, the solvent was removed in vacuo and the product was distilled at .001 mm., B.P. 92–93° C., and had a melting point of 79–81° C. The distillate was analyzed by IR and NMR, which agree with the structure of a dichloroaluminum acetylacetonate.

Elementary analysis gave 35.7% Cl (calc. 36.0%) and 13.8% Al (calc. 13.8%).

Example 2

Commercial aluminum bromide (5.33 g.) was reacted with commercial aluminum-tris-acetylacetonate (3.24 g.) in solution. After the reaction the solution was filtered and the solvent removed in vacuo. After removal of the solvent a solid remained that was shown by analysis to be the dibromoaluminum acetylacetonate.

Example 3

The same experiment was repeated as described in Example 1. However, for a total of 50 grams reactants, 400 ml. of benzene was used as the solvent. The crude reaction product consisted of two liquid layers. After filtration from small amounts of impurities the solvent was removed and a solid was obtained which after distillation gave pure dichloroaluminum acetylacetonate.

The nature of the present invention having thus been fully set forth and examples of the same given, what is claimed as new, useful, and unobvious and desired to be secured by Letters Patent is:

1. The process of preparing a dihaloaluminum acetylacetonate selected from the group consisting of dichloroaluminum acetylacetonate, dibromoaluminum acetylacetonate and mixtures thereof, which comprises reacting a solution of a trihaloaluminum compound with aluminum-tris-acetylacetonate wherein one mole of said acetylacetonate reacts with two moles of said trihaloaluminum to produce three moles of said dihaloaluminumacetylacetonate, removing the solvent and recovering the dihaloaluminum-acetylacetonate.

2. Process according to claim 1 wherein the trihaloaluminum compound is aluminum trichloride.

3. Process according to claim 1 wherein the trihaloaluminum compound is aluminum tribromide.

4. Process according to claim 1 in which the trihaloaluminum compound and the tris-aluminum acetylacetonate are reacted at a temperature between $-60°$ C. and 200° C.

5. Process according to claim 1 wherein the dihaloaluminum acetylacetonate is recovered by distillation at subatmospheric pressure.

6. Process according to claim 1 wherein the solvent is selected from the group consisting of $C_6$ to $C_{10}$ aromatic hydrocarbons, perhydro alicyclic hydrocarbons, $C_1$ to $C_{10}$ halogenated hydrocarbons, nitro-aliphatic hydrocarbons and nitro-aromatic hydrocarbons.

References Cited

UNITED STATES PATENTS

| | | |
|---|---|---|
| 3,135,706 | 6/1964 | Vandenberg. |
| 3,180,838 | 4/1965 | Chiang. |

OTHER REFERENCES

Kambara et al.: J. Poly. Science, vol. 51, pp. 7–10 (1961).

TOBIAS E. LEVOW, Primary Examiner

H. M. S. SNEED, Assistant Examiner